US009719681B2

(12) United States Patent
Zhang et al.

(10) Patent No.: US 9,719,681 B2
(45) Date of Patent: Aug. 1, 2017

(54) SYSTEM AND METHOD FOR SUPPLYING FUEL

(75) Inventors: Hua Zhang, Greer, SC (US); Douglas Frank Beadie, Greer, SC (US); Gregory Allen Boardman, Greer, SC (US); Geoffrey David Myers, Simpsonville, SC (US); William Thomas Ross, Greer, SC (US)

(73) Assignee: General Electric Company, Schenectady, NY (US)

( * ) Notice: Subject to any disclaimer, the term of this patent is extended or adjusted under 35 U.S.C. 154(b) by 1237 days.

(21) Appl. No.: 13/153,585

(22) Filed: Jun. 6, 2011

(65) Prior Publication Data

US 2012/0305086 A1    Dec. 6, 2012

(51) Int. Cl.
| | | |
|---|---|---|
| *F16K 11/20* | (2006.01) | |
| *F23K 5/12* | (2006.01) | |
| *F02C 3/30* | (2006.01) | |
| *F02C 7/22* | (2006.01) | |

(52) U.S. Cl.
CPC .................. *F23K 5/12* (2013.01); *F02C 3/30* (2013.01); *F02C 7/222* (2013.01); *F05D 2240/126* (2013.01); *F05D 2240/127* (2013.01); *Y10T 137/0318* (2015.04); *Y10T 137/85978* (2015.04)

(58) Field of Classification Search
CPC ............... F23K 5/12; F02C 3/30; F02C 7/222
USPC ........ 137/561 A, 564.5, 574, 597, 896, 897; 431/116, 171, 338; 60/739, 39.281, 39.3, 60/39.53, 39.55, 39.58, 39.59
See application file for complete search history.

(56) References Cited

U.S. PATENT DOCUMENTS

| | | | |
|---|---|---|---|
| 3,262,466 A | | 7/1966 | Adams et al. |
| 3,570,512 A | | 3/1971 | Thompson et al. |
| 4,214,435 A | | 7/1980 | Campbell |
| 4,259,021 A | | 3/1981 | Goudy, Jr. |
| 4,413,935 A | * | 11/1983 | Smith et al. .................. 406/181 |
| 4,824,614 A | * | 4/1989 | Jones ............................... 261/76 |
| 5,251,662 A | * | 10/1993 | Rubel et al. ................. 137/875 |
| 5,628,184 A | * | 5/1997 | Santos ....................... 60/39.281 |
| 5,670,093 A | * | 9/1997 | Payne ............................. 261/20 |
| 6,311,472 B1 | * | 11/2001 | Nicodemus .................... 60/775 |
| 6,360,776 B1 | * | 3/2002 | McCormick et al. ........ 137/896 |

(Continued)

FOREIGN PATENT DOCUMENTS

| | | |
|---|---|---|
| CN | 101932880 A | 12/2010 |
| EP | 0 506 069 A1 | 9/1992 |

(Continued)

OTHER PUBLICATIONS

General Electric Company; Chinese Patent Application No. 201210194460.3, filing date Jun. 6, 2011; CN Office Action—Search Report; dated Oct. 10, 2016, (2 pages).

*Primary Examiner* — Jessica Cahill
(74) *Attorney, Agent, or Firm* — Dority & Manning, P.A.

(57) ABSTRACT

A system for supplying fuel includes a fuel manifold, a water manifold, and a fluid junction between the fuel manifold and the water manifold. A turbulator downstream from the fluid junction receives a fluid flow from the fluid junction. A method for supplying fuel includes flowing fuel through a fuel manifold, flowing water through a water manifold, and combining a portion of the water from the water manifold with the fuel from the fuel manifold to create emulsion fuel. The method further includes flowing the emulsion fuel through a turbulator.

17 Claims, 6 Drawing Sheets

(56) References Cited

U.S. PATENT DOCUMENTS

| | | |
|---|---|---|
| 2003/0027089 A1 | 2/2003 | Mueller et al. |
| 2004/0107691 A1* | 6/2004 | Parsons et al. .............. 60/39.53 |
| 2009/0019855 A1* | 1/2009 | Venkataraman et al. ....... 60/738 |
| 2009/0178720 A1* | 7/2009 | Torres ........................ 137/561 A |
| 2010/0236134 A1 | 9/2010 | Mogami et al. |

FOREIGN PATENT DOCUMENTS

| | | |
|---|---|---|
| GB | 2 233 572 A | 1/1991 |
| JP | H1043518 A | 2/1998 |

\* cited by examiner

SYSTEM AND METHOD FOR SUPPLYING FUEL

FIELD OF THE INVENTION

The present invention generally involves a system and method for supplying fuel. In particular embodiments of the present invention, the system and method may include a turbulator and/or a distributor to mix and distribute an emulsion fuel prior to combustion.

BACKGROUND OF THE INVENTION

Combustors are commonly used in industrial and commercial operations to ignite fuel to produce combustion gases having a high temperature and pressure. For example, a typical commercial gas turbine used to generate electrical power may include an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more nozzles in each combustor where the compressed working fluid mixes with fuel and ignites to generate combustion gases having a high temperature and pressure. The combustion gases expand in the turbine to produce work. For example, expansion of the combustion gases in the turbine may rotate a shaft connected to a generator to produce electricity.

The fuel supplied to the combustor may be a liquid fuel, a gaseous fuel, or a combination of liquid and gaseous fuels. If the liquid and/or gaseous fuel is not evenly mixed with the compressed working fluid prior to combustion, localized hot spots may form in the combustor. The localized hot spots may increase the production of nitrous oxides in the fuel rich regions, while the fuel lean regions may increase the production of carbon monoxide and unburned hydrocarbons, all of which are undesirable exhaust emissions. In addition, the fuel rich regions may increase the chance for the flame in the combustor to flash back into the nozzles and/or become attached inside the nozzles which may damage the nozzles. Although flame flash back and flame holding may occur with any fuel, they occur more readily with high reactive fuels, such as hydrogen, that have a higher burning rate and a wider flammability range.

A variety of techniques exist to allow higher operating combustor temperatures while minimizing undesirable exhaust emissions, flash back, and flame holding. For example, water may be added to the fuel to produce an emulsion fuel that enhances combustion efficiency and reduces the peak flame temperature, and thus nitrous oxide production, in the combustor. However, the emulsion fuel inherently tends to quickly separate back into the constituent elements of fuel and water, creating variations in the flow rate and fuel-water content of emulsion fuel supplied to each nozzle. This in turn may create flame instabilities between nozzles, decrease the overall efficiency of the combustor, and increase undesirable emissions. Therefore, an improved system and method for supplying fuel to a combustor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for supplying emulsion fuel. The system includes a fuel manifold, a water manifold, and a fluid junction between the fuel manifold and the water manifold. A turbulator downstream from the fluid junction receives a fluid flow from the fluid junction.

Another embodiment of the present invention is a system for supplying fuel that includes an emulsion fluid manifold and means for dividing a fluid flow from the emulsion fluid manifold substantially equally.

The present invention may also include a method for supplying fuel that includes flowing fuel through a fuel manifold, flowing water through a water manifold, and combining a portion of the water from the water manifold with the fuel from the fuel manifold to create emulsion fuel. The method further includes flowing the emulsion fuel through a turbulator.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system and method for supplying an emulsion fuel to a combustor. In particular embodiments, fuel and water are mixed, and the mixture is directed through a turbulator to further mix the emulsion fuel. A distributor or other means may be used to deliver and/or divide the emulsion fuel in substantially equal amounts to each nozzle in the combustor. Although exemplary embodiments of the present invention will be described generally in the context of a combustor incorporated into a gas turbine for purposes of illustration, one of ordinary skill in the art will readily appreciate that embodiments of the present invention may be applied to any combustor and are not limited to a gas turbine combustor unless specifically recited in the claims.

Figure 1:
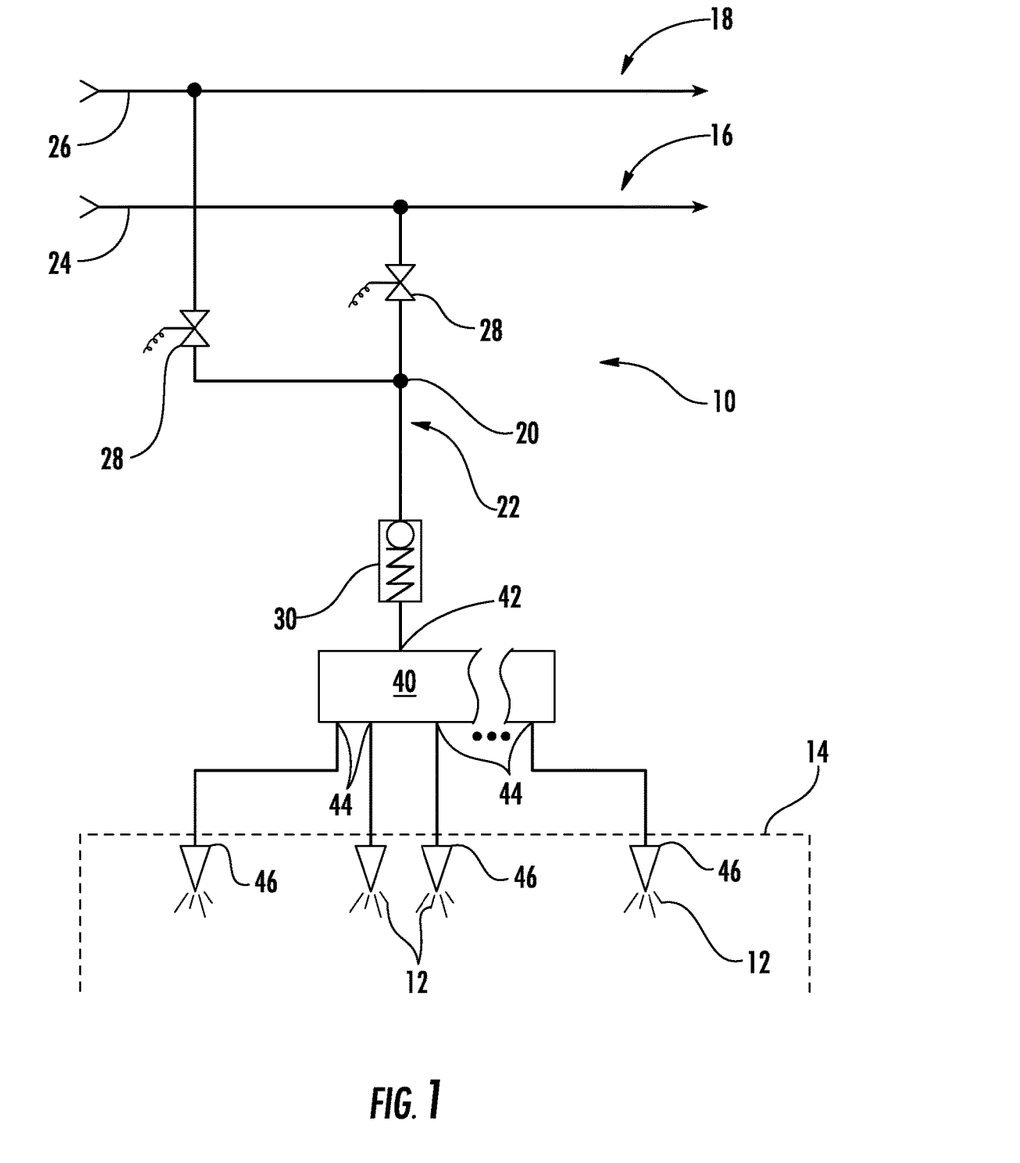
FIG. 1 is a simplified diagram of a system for supplying an emulsion fuel to a combustor according to one embodiment of the present invention.

FIG. 1 provides a simplified diagram of a system 10 for supplying an emulsion fuel 12 to a combustor 14 according to one embodiment of the present invention. As shown, the system 10 generally includes a fuel manifold 16, a water manifold 18, and a fluid junction 20 between the fuel and water manifolds 16, 18 that produces an emulsion fluid manifold 22. As used herein, the term "manifold" includes any pipe or chamber having multiple apertures for making connections. Possible fuels supplied through the fuel manifold 16 may include, for example, blast furnace gas, coke oven gas, natural gas, methane, vaporized liquefied natural gas (LNG), propane, hydrogen, and combinations thereof. The water manifold 16 may contain water, steam, or similar diluents suitable for mixing with the fuel to form the emulsion fuel 12. Each manifold 16, 18, 22 may comprise a combination of suitable piping and valves that facilitate the fluid communication, transport, and isolation of the desired fluids. For example, as shown in FIG. 1, fuel piping 24 and water piping 26 may be used to transport the fuel and water proximate to the combustor 14, and one or more throttle valves 28 may be used to regulate the amount of fuel and/or water supplied to the emulsion fluid manifold 22 and/or combustor 14. The fluid junction 20 may comprise any fluid connection between the fuel manifold 16 and the water manifold 18 that allows the fuel and water to mix to form the emulsion fuel 12.

Figure 2:
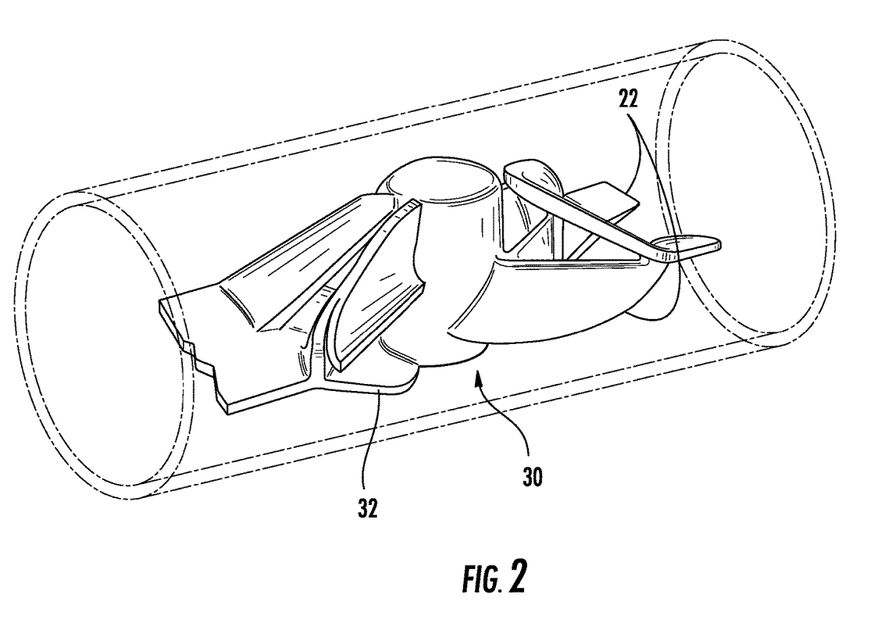
FIG. 2 is a perspective view of a first embodiment of a turbulator.
Figure 3:
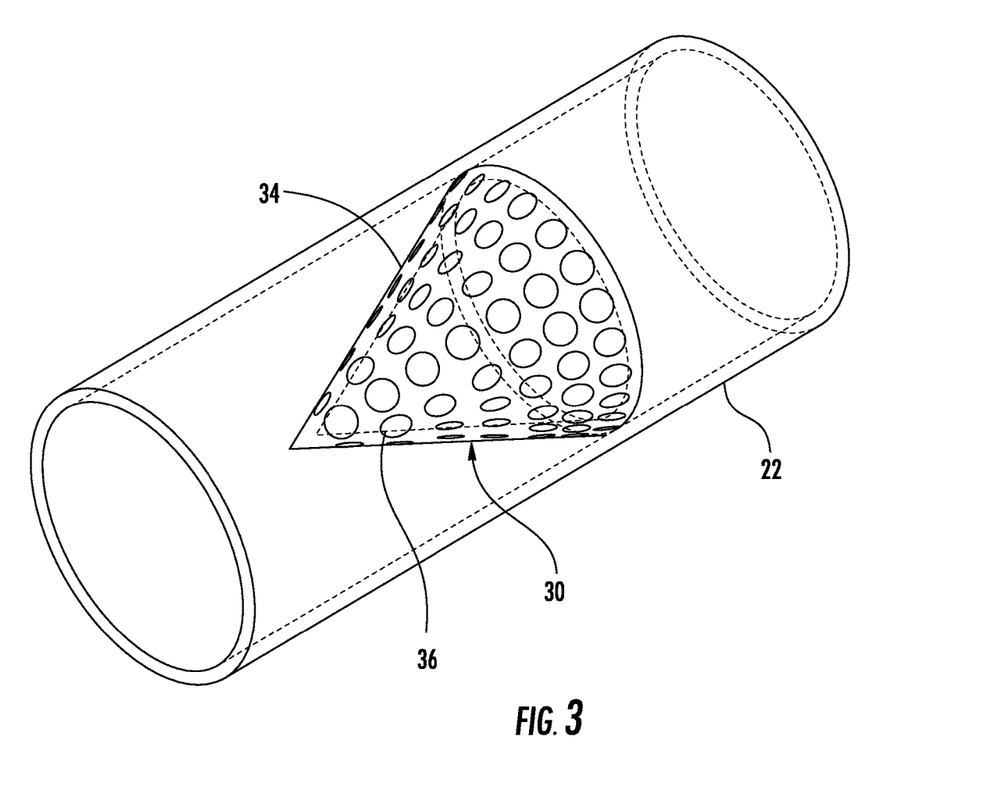
FIG. 3 is a perspective view of a second embodiment of a turbulator.

As shown in FIG. 1, the system 10 may further include a turbulator 30 downstream from the fluid junction 20 and/or inside the emulsion fluid manifold 22. As used herein, the terms "upstream" and "downstream" refer to the relative location of components in a fluid pathway. For example, component A is upstream from component B if a fluid flows from component A to component B. Conversely, component B is downstream from component A if component B receives a fluid flow from component A. FIGS. 2 and 3 provide perspective views of exemplary turbulators 30 within the scope of various embodiments of the present invention. As shown in FIG. 2, for example, the turbulator 30 may comprise a series of twisted wires, plates, or baffles 32. Alternately, as shown in FIG. 3, the turbulator 30 may comprise a screen 34 having a plurality of staggered apertures 36. The screen 34 may comprise a conical surface, a flat surface, or any other geometric shape. In still further embodiments, the turbulator 30 may comprise virtually any tortuous or turbulent pathway over which the emulsion fuel 12 may flow. In each embodiment, the turbulator 30 thus enhances mixing between the fuel and water in the emulsion fluid manifold 22 to prevent the constituent elements from separating before reaching the combustor 14.

Referring back to FIG. 1, the system 10 may further include a distributor 40 downstream from the turbulator 30 and/or emulsion fluid manifold 22. The distributor 40 generally comprises an inlet 42 and a plurality of outlets 44, with each outlet 44 in fluid communication with a separate nozzle 46 in the combustor 14. In this manner, the distributor 40 delivers the emulsion fuel 12 into separate pathways for each nozzle 46.

Figure 4:
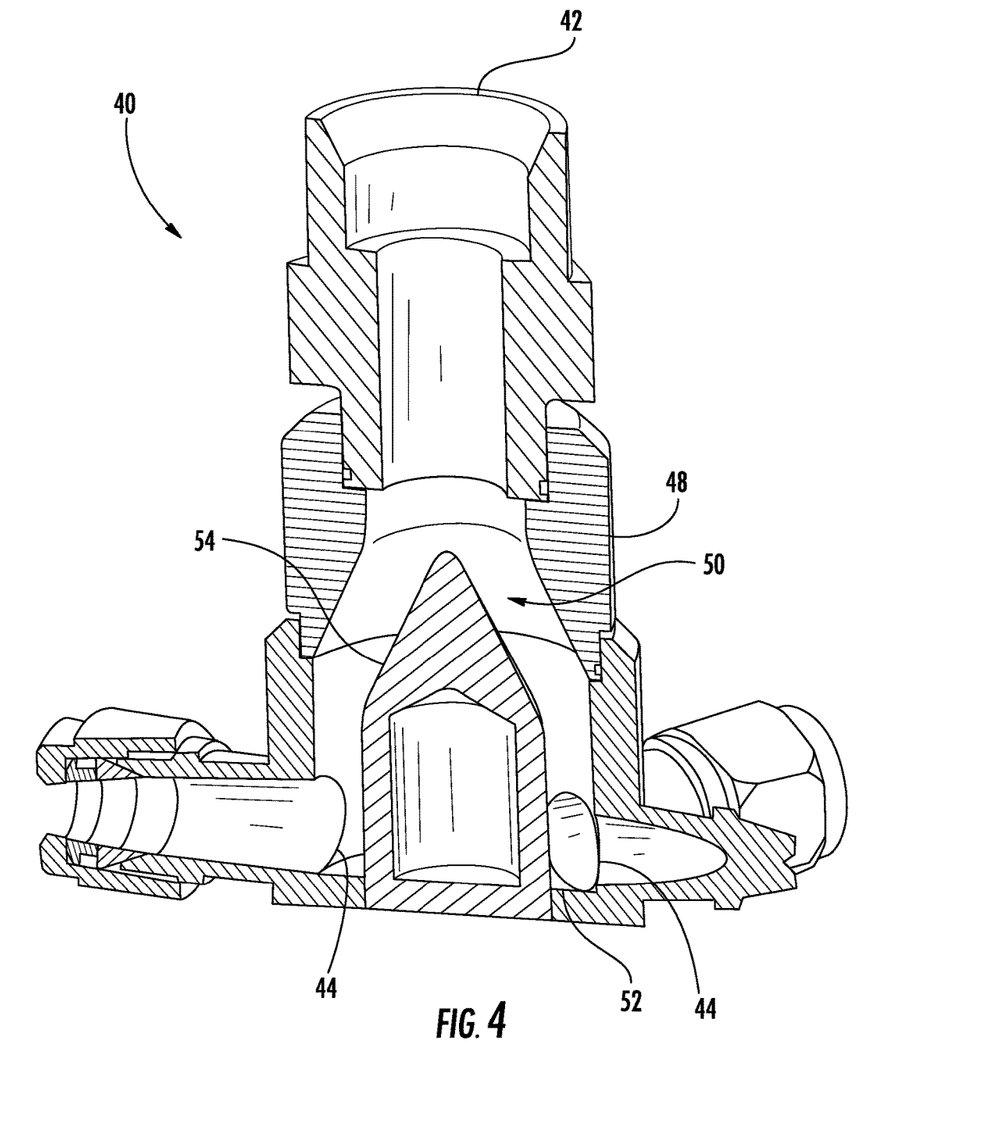
FIG. 4 is a perspective cross-section view of a first embodiment of a distributor.

FIG. 4 provides a perspective cross-section view of a first embodiment of a distributor 40 within the scope of the present invention. As shown, the distributor 40 may further comprise a body 48 that defines a cavity 50 having a bottom surface 52. Each outlet 44 may connect to the cavity 50 at or flush with the bottom surface 52 to reduce or prevent low flow or recirculation regions from forming inside the cavity 50. As a result, the distributor 40 facilitates the ability to change fuels and/or fuel-water ratios in the emulsion fuel 12 without retaining pockets of the old fuel and/or emulsion fuel 12.

As shown in FIG. 4, the distributor 40 may further include means for dividing the fluid flow from the turbulator 30 and/or emulsion fluid manifold 22 substantially equally. In this particular embodiment, the means may comprise a projection 54 that extends from the body 48 into a center portion of the cavity 50. The projection 54 may comprise a cylindrical, conical, spherical, pyramidal, or other geometric shape suitable for dividing a fluid flow. In this manner, the emulsion fuel 12 entering the inlet 42 is divided into substantially equal amounts before exiting the distributor 40 through each outlet 44 and flowing to the respective nozzles 46.

Figure 5:
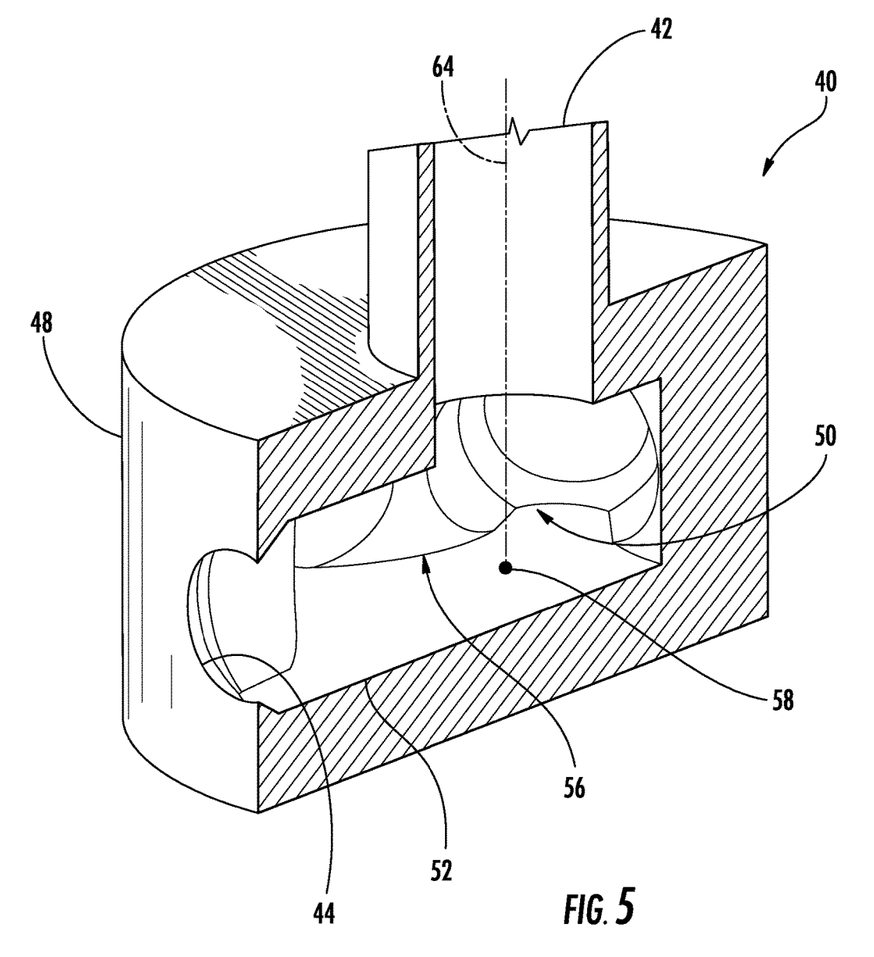
FIG. 5 is a perspective cross-section view of a second embodiment of a distributor.
Figure 6:
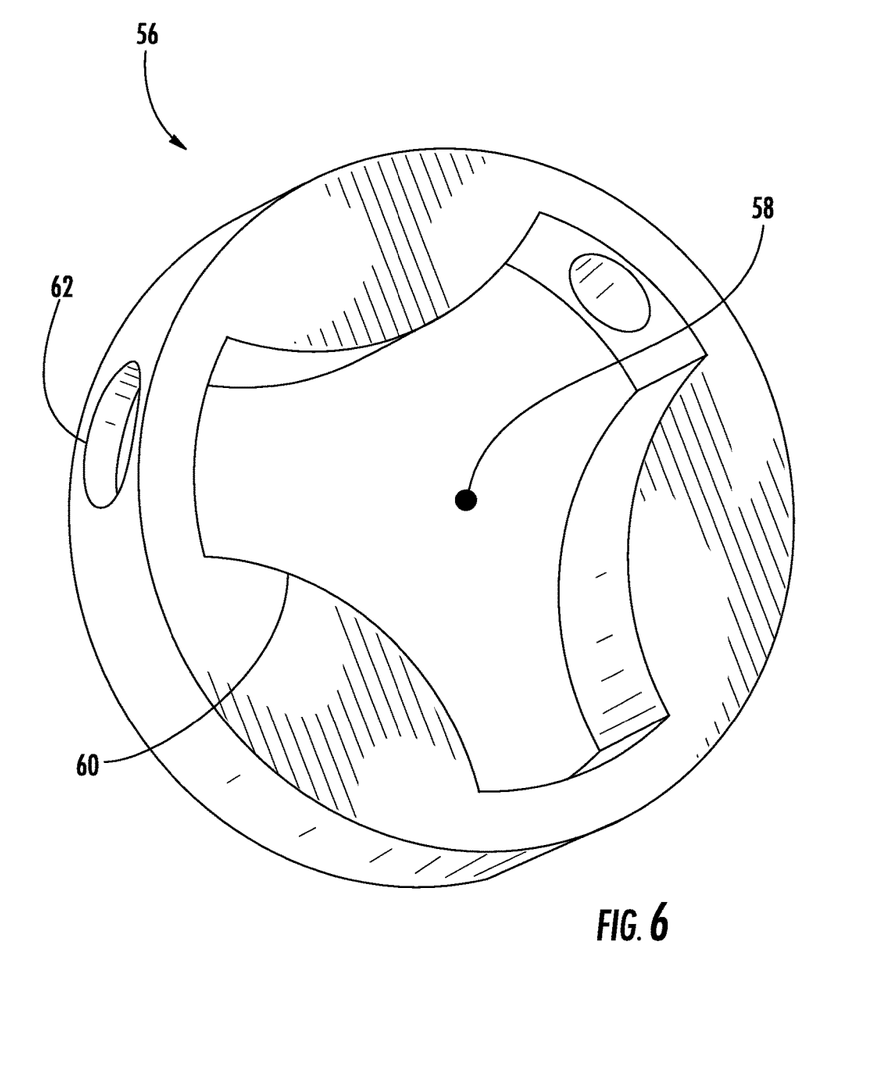
FIG. 6 is a perspective view of an insert shown in FIG. 5.

FIG. 5 provides a perspective cross-section view of a second embodiment of the distributor 40 within the scope of the present invention. The distributor 40 again comprises the inlet 42, outlets 44, body 48, cavity 50, and bottom surface 52 as previously described with respect to the embodiment shown in FIG. 4. In this particular embodiment, the means for dividing the fluid flow from the turbulator 30 and/or emulsion fluid manifold 22 substantially equally comprises an insert 56 inside the body 48 that defines a Nagel point 58 inside the cavity 50. The insert 56 may be defined by the body 48, as shown in FIG. 5, or may constitute a separate component inserted into the body 48, as shown in FIG. 6. In either event, the insert 56 generally defines a triangular opening having curved sides 60, and vertices 62 of the triangular opening generally coincide with the outlets 44 in the distributor 40. As shown in FIG. 5, the inlet 42 is aligned generally coincident with an axis 64 that extends through the Nagel point 58 defined by the insert 56 so that the emulsion fuel 12 entering the inlet 42 is divided into substantially equal amounts before exiting the distributor 40 through the outlets 44 and flowing to the respective nozzles 46.

The system 10 and components shown in FIGS. 1-6 may also provide a method for supplying emulsion fuel 12 to the combustor 14. As previously described, the method generally includes flowing fuel through the fuel manifold 24, flowing water through the water manifold 26, and combining a portion of the water from the water manifold 26 with the fuel from the fuel manifold 24 to create emulsion fuel 12. The method further includes flowing the emulsion fuel 12 through the turbulator 30. In particular embodiments, the method may also include dividing the flow of emulsion fuel 12 substantially equally, distributing the emulsion fuel 12 to the plurality of nozzles 46, and/or dividing the flow of emulsion fuel 12 substantially equally inside the distributor 40. As a result, the system 10 and method shown in FIGS. 1-6 enhance the quality of the emulsion fuel 12 supplied to the combustor 14, thereby improving the combustion efficiency, promoting flame stability between nozzles 46, and reducing undesirable emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for supplying fuel, comprising:
   a. a liquid fuel manifold;
   b. a water manifold;
   c. a fluid junction between the liquid fuel manifold and the water manifold to create an emulsion fuel;
   d. a turbulator downstream from the fluid junction, wherein the turbulator receives the emulsion fuel from the fluid junction; and
   e. a distributor downstream from the turbulator, wherein the distributor comprises an inlet and a plurality of outlets; and
   f. means for dividing the emulsion fuel from the turbulator substantially equally.

2. The system as in claim 1, wherein the turbulator comprises one or more baffles.

3. The system as in claim 1, wherein the turbulator comprises a plurality of apertures.

4. The system as in claim 1, wherein the distributor comprises a body that defines a Nagel point, and the inlet is aligned along an axis that passes through the Nagel point.

5. The system as in claim 1, wherein the distributor comprises a body that defines a cavity having a bottom surface, and the plurality of outlets connect to the cavity at the bottom surface.

6. The system as in claim 1, wherein the distributor comprises a body that defines a cavity, and a projection extends from the body into a center portion of the cavity.

7. A system for supplying fuel, comprising:
   a. an emulsion fluid manifold;
   b. means for dividing a flow of emulsion fuel from the emulsion fluid manifold substantially equally; and
   c. a turbulator inside the emulsion fluid manifold upstream from the means for dividing.

8. The system as in claim 7, wherein the turbulator comprises one or more baffles.

9. The system as in claim 7, wherein the turbulator comprises a plurality of apertures.

10. The system as in claim 7, wherein the means for dividing comprises a distributor downstream from the emulsified fluid manifold, wherein the distributor comprises an inlet and a plurality of outlets.

11. The system as in claim 10, wherein the distributor comprises a body that defines a Nagel point, and the inlet is aligned along an axis that passes through the Nagel point.

12. The system as in claim 10, wherein the distributor comprises a body that defines a cavity having a bottom surface, and the plurality of outlets connect to the cavity at the bottom surface.

13. A system for supplying fuel, comprising:
    an emulsion fluid manifold;
    means for dividing a flow of emulsion fuel from the emulsion fluid manifold substantially equally; and
    a turbulator inside the emulsion fluid manifold upstream from the means for dividing,
    wherein the means for dividing comprises a distributor downstream from the emulsified fluid manifold, wherein the distributor comprises an inlet and a plurality of outlets, and wherein the distributor comprises a body that defines a cavity, and a projection extends from the body into a center portion of the cavity.

14. The system as in claim 13, wherein the turbulator comprises one or more baffles.

15. The system as in claim 13, wherein the turbulator comprises a plurality of apertures.

16. The system as in claim 13, wherein the body defines a Nagel point, and the inlet is aligned along an axis that passes through the Nagel point.

17. The system as in claim 13, wherein the cavity has a bottom surface, and the plurality of outlets connect to the cavity at the bottom surface.

\* \* \* \* \*